(12) United States Patent
Li (10) Patent No.: US 11,579,869 B2
(45) Date of Patent: Feb. 14, 2023

(54) METHOD, SYSTEM FOR EDITING A COMMAND SET AND DEVICE APPLYING THE METHOD

(71) Applicant: PIXART IMAGING INC., Hsin-Chu (TW)

(72) Inventor: Jr-Yi Li, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 204 days.

(21) Appl. No.: 17/162,625

(22) Filed: Jan. 29, 2021

(65) Prior Publication Data

US 2022/0244955 A1 Aug. 4, 2022

(51) Int. Cl.
*G06F 9/24* (2006.01)
*G06F 9/22* (2006.01)
*G06F 3/04883* (2022.01)
*G06F 3/038* (2013.01)

(52) U.S. Cl.
CPC ............ *G06F 9/223* (2013.01); *G06F 3/0383* (2013.01); *G06F 3/04883* (2013.01); *G06F 9/24* (2013.01)

(58) Field of Classification Search
CPC . G06F 9/223; G06F 9/24; G06F 3/033; G06F 3/03541
See application file for complete search history.

(56) References Cited

U.S. PATENT DOCUMENTS

| 6,976,209 | B1 * | 12/2005 | Storisteanu | ........... G06F 40/169 715/201 |
| 9,910,512 | B1 * | 3/2018 | Tiwary | .................... G06F 3/038 |
| 2005/0073501 | A1 * | 4/2005 | Chen | ................... G06F 3/03543 345/163 |
| 2021/0318761 | A1 * | 10/2021 | Dunant | ................... G06F 3/038 |

FOREIGN PATENT DOCUMENTS

| CN | 1855045 A | 11/2006 |
| TW | 1263159 B | 10/2006 |

* cited by examiner

*Primary Examiner* — Jacob Petranek
(74) *Attorney, Agent, or Firm* — Li & Cai Intellectual Property (USA) Office (57) ABSTRACT

A device, and a method and a system for editing command sets applied to the device are provided. The system includes an editor installed in a computer device for initiating an editing interface used to edit one or more command sets applied to the device and a writer used to convert the command sets into profiles with a format specified to the device. The command sets are used to form the profiles configured to be written to the device via the writer. The command sets including a set of scripts of commands and input codes specified to the device can be edited through the editor. The device is a computer mouse with multiple keys. The keys can be used to switch the profiles stored in the device, and the command set of the profile being activated is applied to the device for operating the device.

26 Claims, 9 Drawing Sheets

| | MACRO Event | | | | | |
|---|---|---|---|---|---|---|
| MACRO_1 | # | Delay Time | Repeat | Repeat Count | X | Y | Wheel |
| MACRO_2 | 1 | KEY_W_PRESS | 1576 | 0 | 0 | 0 | 0 |
| MACRO_3 | 2 | KEY_SPACE_PRESS | 431 | 0 | 0 | 0 | 0 |
| MACRO_4 | 3 | KEY_SPACE_RELEASE | 47 | 0 | 0 | 0 | 0 |
| MACRO_5 | 4 | KEY_W_RELEASE | 2557 | 0 | 0 | 0 | 0 |

MACRO Command ~905

LEFT_PRESS
LEFT_RELEASE
RIGHT_PRESS
RIGHT_RELEASE
MIDDLE_PRESS
MIDDLE_RELEASE
PREV_PAGE_PRESS
PREV_PAGE_RELEASE
NEXT_PAGE_PRESS
NEXT_PAGE_RELEASE
KEY_A_PRESS
KEY_A_RELEASE

Mouse Key Option ~907
○ Delay Time ___ ms
○ Repeat Start
○ Repeat Stop
○ Insert Position X___ Y___ Wheel___

Record Option ~909
○ Delay Setting ___ ms
○ Record Delay
○ Not Delay

FIG. 9

METHOD, SYSTEM FOR EDITING A COMMAND SET AND DEVICE APPLYING THE METHOD

FIELD OF THE DISCLOSURE

The present disclosure relates to a technology for coding command set applied to a device, and more particularly to a method, a system for editing the command sets adapted to various formats, and a device applying the method.

BACKGROUND OF THE DISCLOSURE

A modern computer input device, for example a computer mouse, generally includes multiple function keys in addition to the legacy keys such as the left, right and middle keys of the computer mouse. A driver program proprietary to the input device is provided by a manufacturer thereof for a computer system that the input device is connected with to function the input device appropriately. Some basic settings for the input device can be managed through the driver program. For example, a user can set up DPI (dots per inch) for the computer mouse via a driver interface in order to adjust a speed of a cursor when the cursor is moved over a computer screen.

Further, an advanced multi-key computer input device is designed to have additional function keys for various specific purposes, e.g., gaming, and functions applied to the function keys can be customized or edited via a specific program such as the above-mentioned driver program. However, most manufacturers develop their own specifications to define the functions specified to their products, such that their products have very low compatibility with other products. Therefore, in the conventional technologies, various computer input devices are required to be driven by corresponding proprietary driver programs. It is inconvenient for the user to install proprietary driver programs to a computer system for driving the corresponding computer input devices. Furthermore, the user is required to use proprietary editors to edit commands applied to the functions of the computer input devices when the user sets up the computer input devices.

Still further, the advance multi-key computer input device, for example, a gaming computer mouse, may support multiple switchable profiles that can be selectively activated to drive multiple function keys of the advanced multi-key computer input device in order to adapt to different applications. Similarly, the functions applied to the multiple function keys can still be edited through a proprietary editor that supports other devices even when compatibility is low.

SUMMARY OF THE DISCLOSURE

In response to the above-referenced technical inadequacies, the present disclosure provides a universal solution for editing a command set that can be applied to various devices. Provided in the disclosure is a method and a system for editing a command set, and a device applying the method.

For a single device, which is able to store multiple command sets for different applications, user can therefore select proper command set once they decide to launch a particular applications in a computer. Therefore user does not to replace a previous command set as long as the device still has sufficient storage space for a new command set. Sometimes similar devices are made by different manufacturers, the user can then edit the desired command sets in an editor installed in the computer, and convert the command set to fit different protocols of different manufacturers through a communication interface.

In one aspect, the present disclosure provides a system for editing a command set applied to a device. The system includes an editor that is installed in a computer device and is used to initiate an editing interface to edit one or more command sets that are correspondingly used to form one or more profiles operated for activating functions of the device. The device includes three or more available memory spaces that are provided to store the one or more profiles and is capable of saving other files. The system includes a writer that is used to convert the one or more command sets into the one or more profiles that are in accordance with a format specified to the device, and are available to be written to the device.

It should be noted that the command set edited in the editor includes a set of scripts of commands and corresponding one or more input codes specified to the device.

In certain embodiments, the input codes can be key codes of the device which includes one or more keys, touch commands of the device which includes a touch panel, or gesture commands of the device which is able to be functioned by gesture.

In one of the embodiments, the device can be an input device adopting a human-interface-device (HID) standard which defines data packets being communicated with a host and supports a series of input codes configured to form the one or more profiles.

In one further embodiment, the editor uses a storage space of the computer device to store the one or more profiles that are selectively provided to be written to the device based on a memory capacity of the device, and one of the profiles stored in the device can be activated in the device according to the switching signal.

Further, the editor is configured to support multiple formats defined by different manufacturers of various devices. The one or more command sets edited by the editor are originally stored as a generic format in the computer device and then converted to the one or more profiles in accordance with one of the formats so as to be written to the device that is connected to the computer device.

In another aspect, the present disclosure provides a method for editing a command set applied to a device. In the method, an editing interface is initiated and used to edit one or more command sets that are correspondingly used to form one or more profiles operated for activating functions of the device. After that, a writer converts the one or more command sets into the one or more profiles that are in accordance with a format specified to the device, and the one or more profiles are selectively written to the device.

In yet another aspect, the present disclosure provides a device that includes a micro-controller, a memory, an input interface and a communication interface. The memory is used to store one or more profiles and each of the profiles records one or more command sets including a set of scripts of commands and corresponding one or more input codes specified to the device. The input interface is electrically connected with the micro-controller and able to initiate an input event configured to activate one of the profiles stored in the device and initiate a command for a host. The communication interface is also electrically connected with the micro-controller and configured to connect with the host for transmitting the command activated through the input interface via a communication protocol.

Furthermore, the one or more command sets specified to the device can be edited via an editing interface initiated in the editor installed in the computer device. The one or more command sets are correspondingly converted to the one or more profiles in accordance with a format specified to the device. The one or more profiles are selectively provided to be written to the device and one of the profiles stored in the device can be activated in the device according to a switching signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A method and a system for editing a command set, and a device applying the method are provided in the present disclosure. One of the objectives of the method and the system is to provide a solution for editing the command set that can be used as profiles applied to various devices in order to activate function keys of an individual device. For example, the command set can be edited by a user via an editing interface that is initiated by a computer system and the command set is then applied to a computer mouse having keys for activating user-defined functions of the keys of the computer mouse. Generally, the functions applied to the keys are adapted to various applications, e.g., playing computer game or different scenarios. Nowadays, a computer game may require complex script of inputting to complete an action when playing the game, such as pressing different buttons of mouse and/or keys of keyboard in a particular sequence. That inputting sequence can be edited as a command set by the user, and then the command set can be triggered by clicking a particular button, key, or combination thereof. The user may have to store various command sets corresponding to different games or characters. Besides computer games, similar application can be applied in other computer programs. The following embodiments disclose more details of the present invention.

Figure 1:
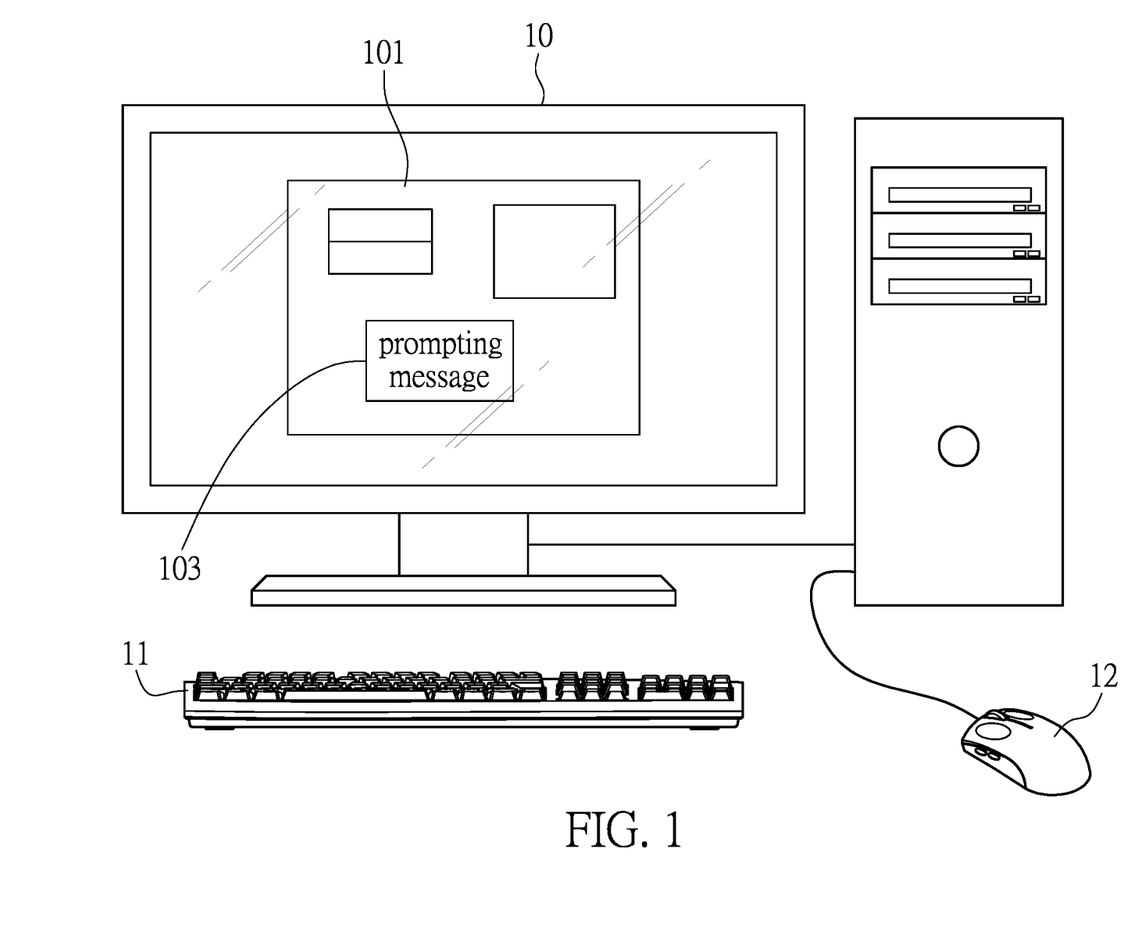
FIG. 1 is a schematic view depicting a system for editing a command set applied to an input device according to one embodiment of the present disclosure.

FIG. 1 is a schematic diagram depicting the system for editing a command sets applied to an input device according to one embodiment of the disclosure. A computer system is operated in a computer device 10 shown in FIG. 1, and an editor 101 installed in the computer system is provided for the user to edit a command set that can be applied to a device such as a peripheral device of the computer device 10. For example, the user can edit one or more command sets specified to the device such as a first input device 11 or a second input device 12 that is connected to the computer device via an editing interface initiated in the editor 101.

After one or more command sets are edited and saved to a system memory of the computer device 10, the one or more command sets are correspondingly converted to one or more profiles in accordance with a format specified to the device, e.g., the first input device 11 or the second input device 12. After that, the one or more profiles can be selectively written to the device. When the device is in operation, one of the profiles stored in the device can be activated according to a switching signal. For example, the switching signal is one type of input events performed on the device. According to one embodiment of the present disclosure, when one of the profiles is activated according to the switching signal, a prompting message 103 as shown on the screen of the computer device 10 may be generated in the computer system.

Figure 2:
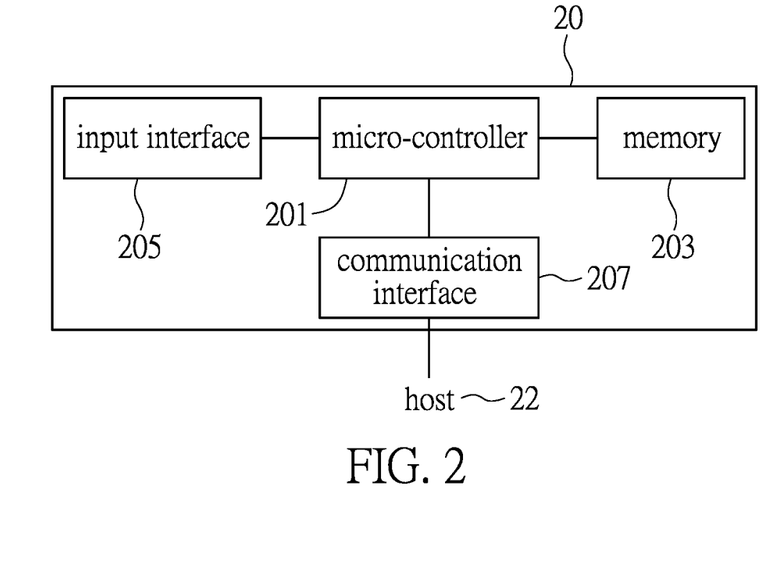
FIG. 2 is a function block diagram of a device that is able to activate a profile provided by a host according to one embodiment of the present disclosure.

FIG. 2 is a functional block diagram of a device 20 that is connected to a host 22. The device 20 can be an input device that is communicated with the host 22 via a communication interface 207 and is able to activate one of the profiles provided by the host 22.

The device 20 generally includes a micro-controller 201 that is used to operate the functions of the device 20 and other components electrically connected to the micro-controller 201. The device 20 includes a memory 203 that is configured to store the above-mentioned one or more profiles that are provided by the host 22. The one or more profiles are selectively provided to be written to the device 20 based on a memory capacity of the device 20. One of the profiles stored in the device 20 can be activated in the device 20 according to the switching signal.

In one aspect of the disclosure, the device 20 has an input interface 205 that includes one or more programmable keys or a touch panel. Further, the input interface 205 of the device 20 operatively generates input codes that are key codes of the device 20 when the device has one or more keys. Alternatively, the input codes can be touch commands of the device 20 when the device has a touch panel, or gesture commands of the device 20 when the device is able to be functioned by gesture.

Further, the memory 203 of the device 20 is used to store one or more profiles and each of the profiles records one or more command sets including a set of scripts of commands and corresponding one or more input codes specified to the device 20. The input interface 205 of the device 20 is able to initiate an input event configured to activate one of the profiles stored in the device 20 and also initiate a command for the host 22. The communication interface 207 is configured to connect with the host 22 for transmitting the command activated through the input interface 205 via a communication protocol.

Figure 3:
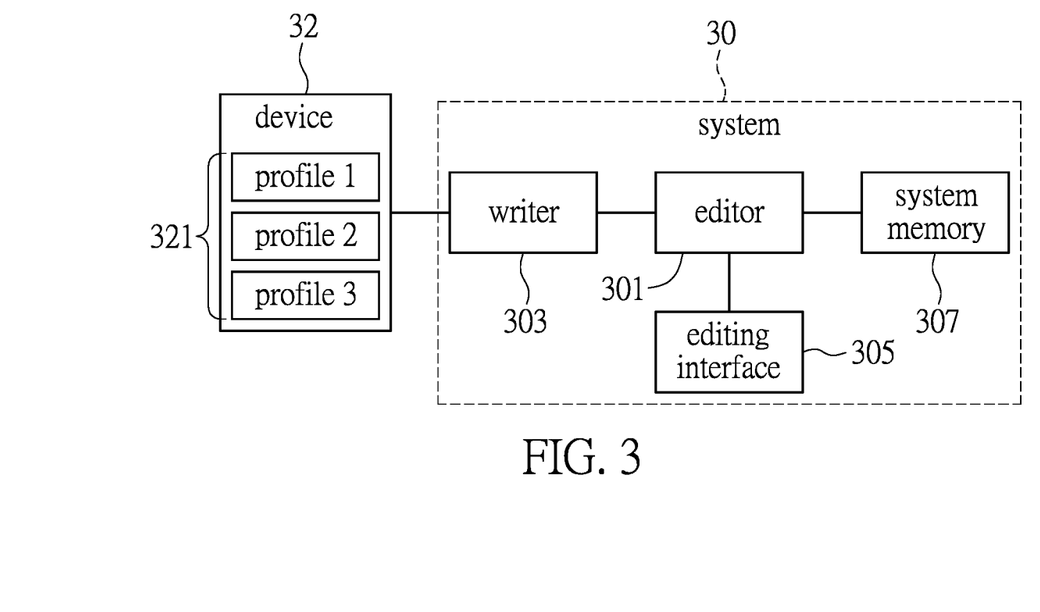
FIG. 3 is a schematic diagram depicting a system for editing a command set applied to a device according to one embodiment of the present disclosure.

Reference is made to FIG. 3, which is a schematic diagram depicting a system for editing a command set applied to a device according to one embodiment of the present disclosure.

A system 30 shown in FIG. 3 can be a computer system. The system 30 is provided for editing a command sets applied to a device 32. The system 30 includes an editor 301 used to initiate an editing interface 305 provided for the user to edit one or more command sets that are correspondingly used to form one or more profiles operated for activating functions of the device 32. The system 30 includes a writer 303 used to convert the one or more command sets into the one or more profiles. The one or more profiles are available to be written to the device 32. For the device 32 that may particularly support a specific format for storing the one or more profiles, the writer 303 is used to write the one or more profiles that are in accordance with the format specified to the device 32.

In one aspect of the disclosure, in the system 30, the editor 301 uses a storage space, e.g., a system memory 307, to store the one or more profiles that are selectively provided to be written to the device 32 through the writer 303 based on a memory capacity of the device 32. The memory spaces 321 allow the device 32 to be able to store a plurality of sets of scripts of commands. The command set forming the profile edited in the editor 301 includes a set of scripts of commands and corresponding one or more input codes specified to the device 32. According to the present example, the device 32 includes three or more available memory spaces 321 being provided to store the profiles (profile 1, profile 2 and profile 3) and also free to save other files. One of the profiles stored in the device 32 can be activated in the device 32 according to a switching signal.

Furthermore, it should be noted that the editor is able to operate under different modes. For example, in an aspect of the disclosure, the editor can operate under an online mode when the device is connected with a computer device via a communication interface, and the one or more profiles stored in the computer device can be selectively written to the device by the writer when the one or more command sets has been edited. In another aspect of the disclosure, the editor can also operate under an offline mode when the device is not connected with the computer device. Under the offline mode, the one or more command sets can be edited and then stored in the computer device. After that, the one or more profiles can be selectively written to the device by the writer when the device is connected with the computer device via the communication interface.

Figure 4:
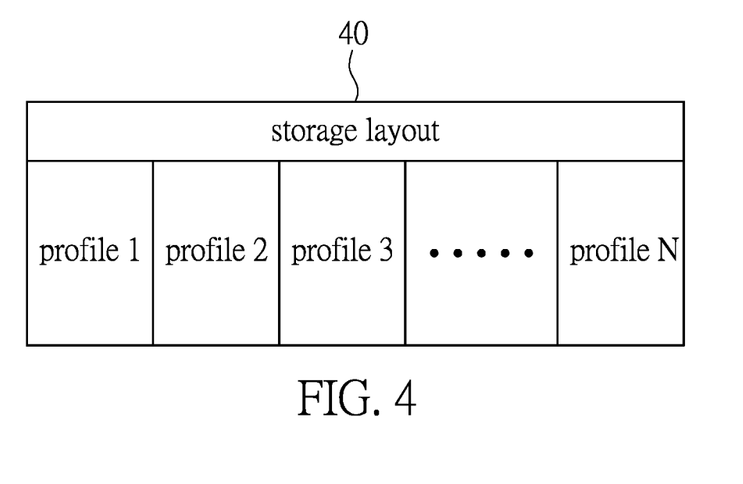
FIG. 4 is a schematic diagram depicting a storage layout in the device according to one embodiment of the present disclosure.

FIG. 4 is a schematic diagram depicting a storage layout in the device according to one embodiment of the present disclosure.

Via the above-mentioned editing interface initiated in the editor, the user can edit one or more command sets that are then correspondingly converted to the one or more profiles in accordance with a format specified to the device. After that, as shown in the diagram, one or more memory spaces form a storage layout 40 of the device according to a specification of the device. The one or more profiles such as the profile 1, profile 2, profile 3, . . . , profile N can therefore be stored to the memory of the device based on the storage layout 40.

Figure 5:
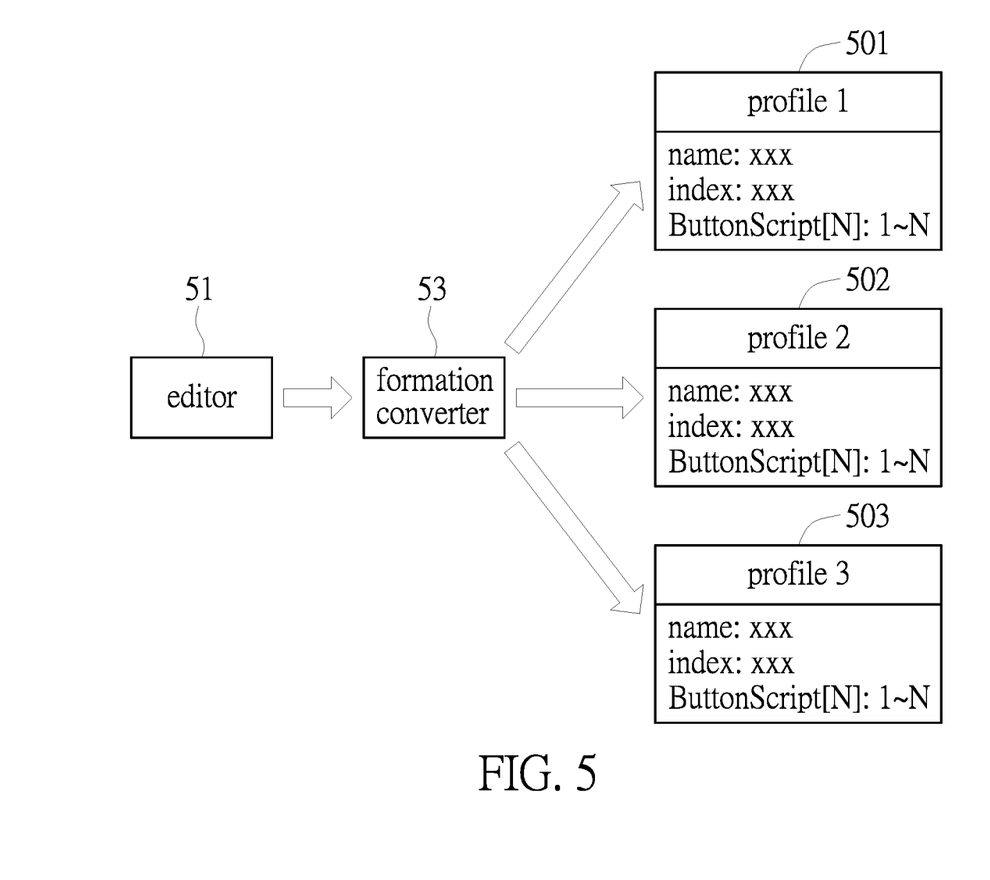
FIG. 5 is a schematic diagram depicting an editor operated in a computer device in one embodiment of the present disclosure.

The above-mentioned editor schematically can be referred to as in FIG. 5 which depicts a technical concept of the editor operated in a computer device in one embodiment of the present disclosure.

In an aspect, an editor 51 executed in a computer system is used to edit the command sets that are applied to a device. The editor 51 is configured to support multiple formats specified by different manufacturers of various devices. The one or more command sets that may be originally stored as a generic format in a computer device can be edited by the editor 51 and then converted via a formation converter 53 to the one or more profiles in accordance with one specific format supported by a device connected to the computer device. The one or more profiles can be written to the device that is connected to the computer device. In an exemplary example shown in the diagram, the profiles including a profile 1 (501), a profile 2 (502) and profile 3 (503) are written to the device, in which each of the profiles has a name, index and settings applied to the input codes (e.g., ButtonScript[N]: 1~N) of the device.

Further, the device can be an input device that adopts a human-interface-device standard connected to a computer device. The human-interface-device standard defines data packets being communicated with a host (e.g., the computer device) and supports a series of input codes configured to form the one or more profiles.

Figure 6:
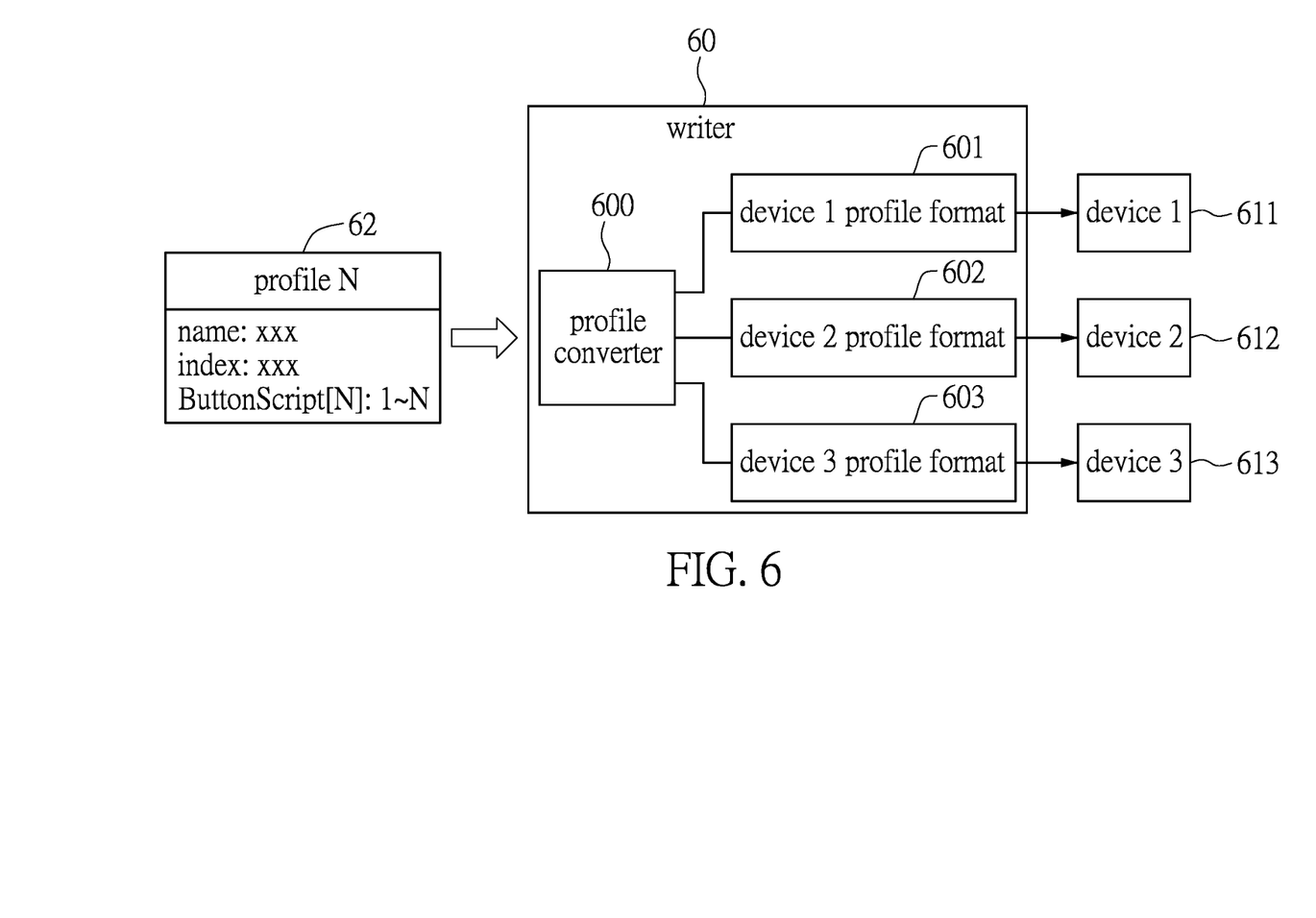
FIG. 6 is a schematic diagram depicting a writer operated in a computer device in one embodiment of the present disclosure.

Reference is further made to FIG. 6, which is a schematic diagram depicting a writer operated in the computer device in one embodiment of the present disclosure.

In an exemplary example shown in the diagram, when the profile N (62) is formed from the series of input codes through the editor in the computer device, a writer 60 can be used to convert the profile N (62) into various profiles that conform with various formats specified to different devices, e.g., a device 1 (611), a device 2 (612) and a device 3 (613), respectively.

According to one of the embodiments of the present disclosure, the writer 60 provides a profile converter 600 that is configured to convert the profile N (62) into different profiles based on the formats, e.g., a device 1 profile format 601, a device 2 profile format 602 and a device 3 profile format 603 supported by the corresponding devices such as the device 1 (611), the device 2 (612) and the device 3 (613).

Furthermore, it should be noted that the profiles stored in the memory of the device can be readable by the editor installed in the computer system and also available to be edited by the editor. Therefore, the profiles stored in the computer system can be obtained from the device. For example, the computer system can retrieve profile 1 from the memory of the device 1 via the writer, and thus the writer converts the profile 1 into the format that is supported by the editor. After that, command sets of the profile 1 that are original or modified can also be available to other devices.

Figure 7:
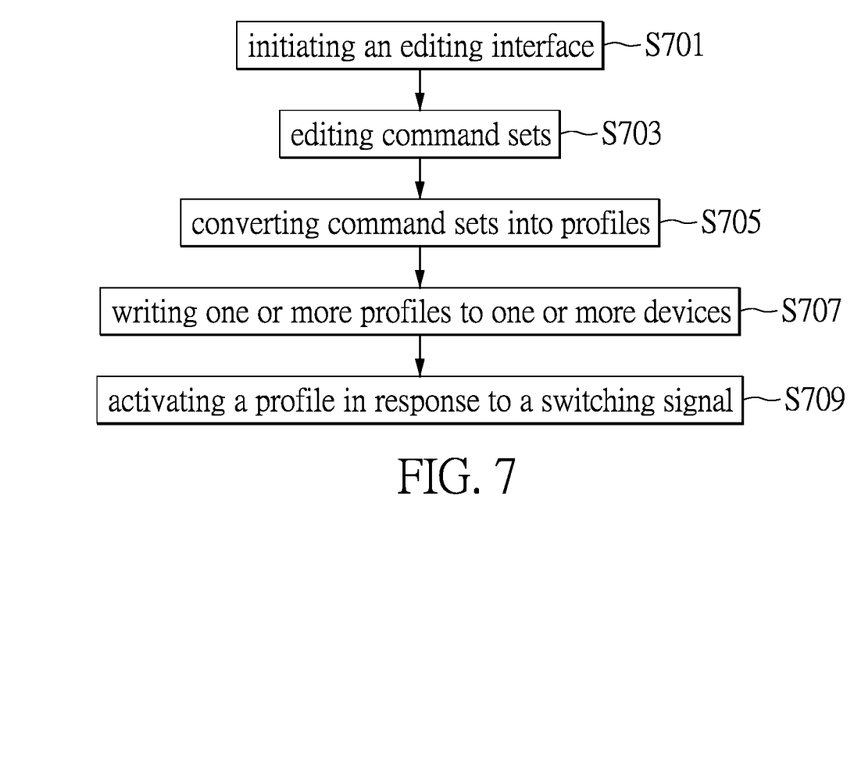
FIG. 7 is a flowchart describing a method for editing a command set applied to a device according to one embodiment of the present disclosure.
Figure 8:
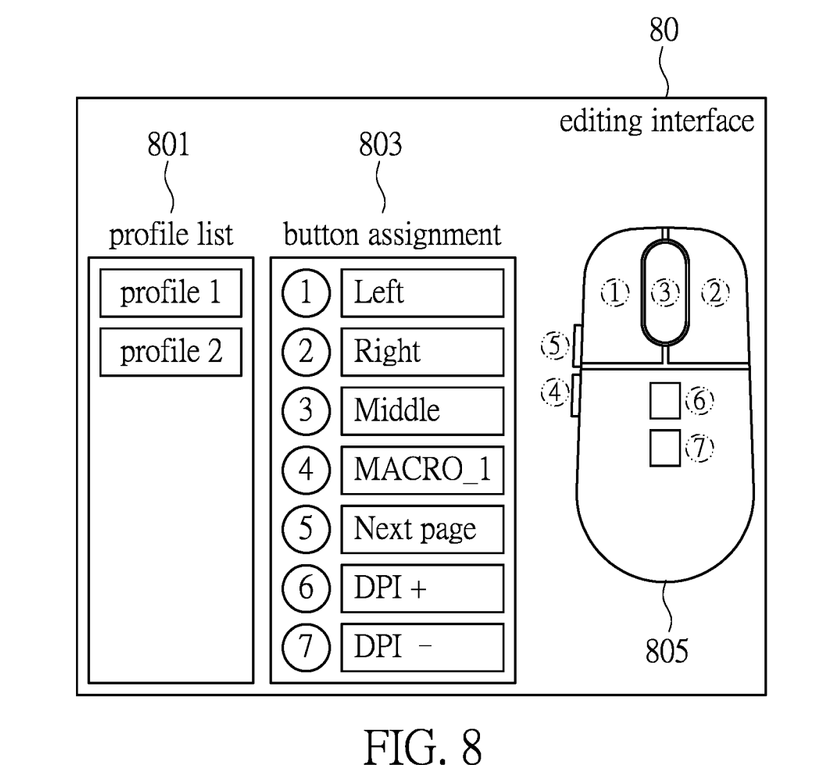
FIG. 8 is a schematic diagram depicting an editing interface according to one embodiment of the present disclosure.
Figure 9:
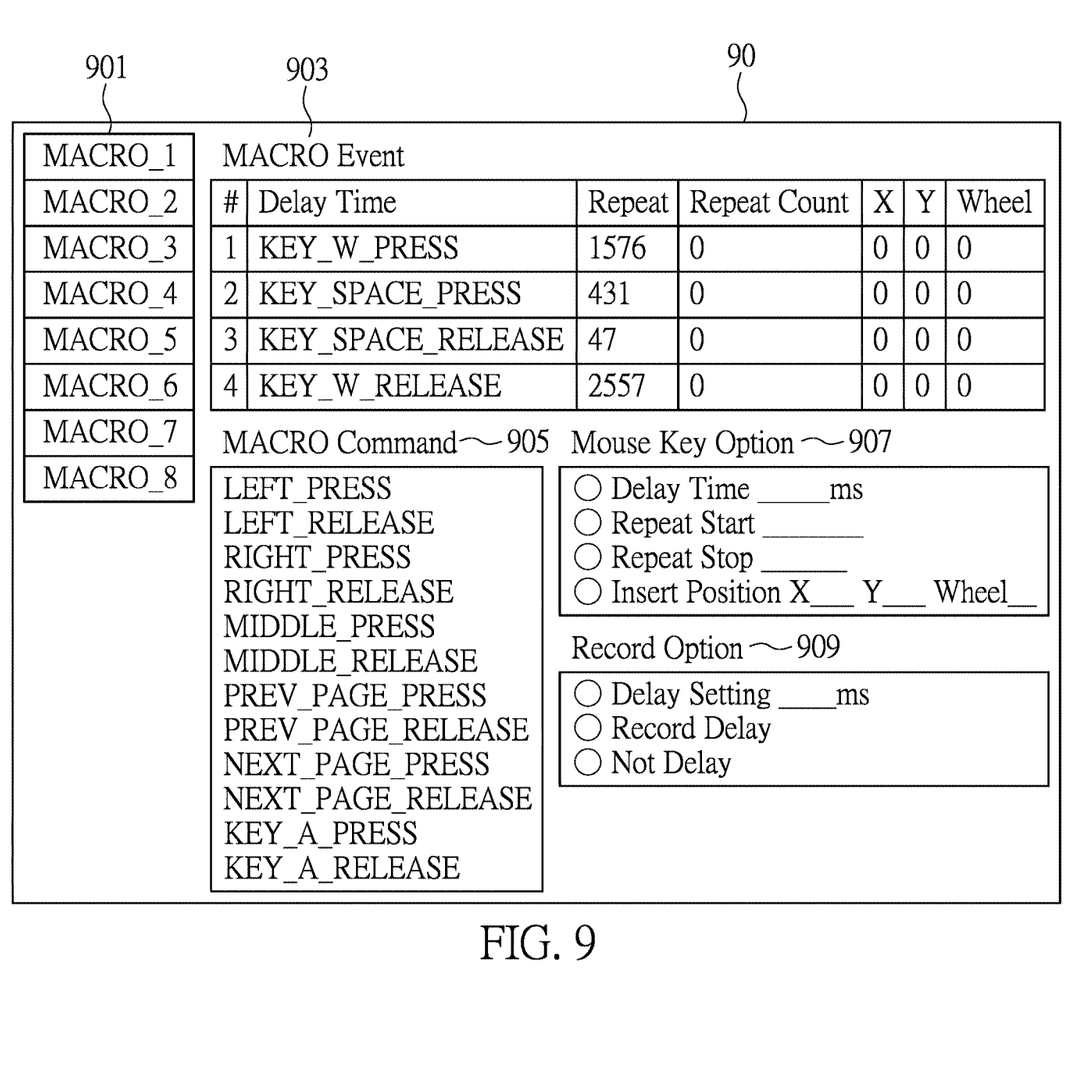
FIG. 9 is a schematic diagram depicting another editing interface according to one further embodiment of the present disclosure.

As discussed above, the system for editing a command set applied to a device utilizes an editor provided for editing the command sets and a writer used to convert the command sets into one or more profiles so as to implement a method described in a flow chart shown in FIG. 7 in view of the schematic diagrams shown in FIG. 8 and FIG. 9 according to one embodiment of the present disclosure. To embody the method for editing a command set applied to a device, the system utilizes the editor installed in a computer system to edit the command set and form one or more profiles that can be adapted to various devices.

Firstly, an editing interface is initiated in the editor (step S701). The one or more command sets specified to the device can be edited via the editing interface. For example, the editing interface is such as an editing interface 80 of FIG. 8 or an editing interface 90 shown in FIG. 9. The editing interface 80 or the editing interface 90 can be a graphical user interface that provides a visualized editing tool allowing a user to edit the command sets. The command sets that are used to form one or more profiles may be originally stored as a proprietary format in a storage space of a computer device.

The user can edit the command set(s) through the editing interface (step S703). After being edited, the one or more command sets are correspondingly converted to the one or more profiles in accordance with a format specified to the device (step S705).

For example, the one or more profiles form a profile list 801 as shown in FIG. 8, and the profiles listed in the profile list 801 are selectively provided to be written to the device.

When one of the profiles is selected through the editing interface 80, the content of the selected profile can be extracted so as to reveal a set of scripts of commands and corresponding one or more input codes specified to the device.

A table of button assignment 803 shown in the editing interface 80 is as an example of settings of a series of input codes such as the key codes specified to an input device 805 of FIG. 8. With the input device 805 as an example, the settings of the input codes are used to specify functions such as a left button, a right button, a middle button, a macro script, turning to next page, increasing DPI (dots per inch) and decreasing DPI assigned to multiple keys of the input device 805. In FIG. 8, the input device 805 is shown as a computer mouse that includes multiple keys, in which one or more of the keys are used to switch multiple profiles stored in the memory of the computer mouse.

Furthermore, the editor also provides a setting page for editing the macro scripts specified to the device. As shown in FIG. 9, the editing interface 90 provides a macro list 901 that lists a plurality of macros to be edited. When one of the macros is selected from the macro list 901, the user is allowed to edit the macro script that may record a series of commands including the macro event 903, macro command 905, mouse key option 907 and record option 909.

Therefore, when the macro scripts are edited, the macro scripts can be stored in the computer system. The macro can be applied to the device once the profile including the macro is selected to be written to the device (step S707) and the profile can be activated in the device according to a switching signal (step S709).

When one of the profiles is activated, one corresponding command set including a set of scripts of commands and corresponding one or more input codes is applied to the device. For example, if the device is able to be functioned by gesture and a series of gestures performed by a user are recorded as one of the profiles via the editor, when any gesture is performed, a series of gesture commands corresponding to the command set specified to the device are generated. Further, when the series of gestures specified in the profile applied to the device are performed, the corresponding command set is operated to execute functions of an application executed in the computer device that is connected with the device.

The switching signal can be one type of an input event that is performed on the device or by the computer device connected with the device. In an exemplary example, by actuating one or a combination of keys, the corresponding command set applied to the device is operated to execute functions of an application executed in the computer device. That is, the switching signal can be generated by the computer device, or by a switching event performed on the device so as to activate one of the profiles stored in the device.

In conclusion, the method and the system for editing a command set applied to a device according to the embodiments of the present disclosure allow one or more command sets to be edited for forming one or more profiles to be applicable to various peripheral devices of a computer device. The one or more profiles can be selectively written to the device based on the memory spaces. Accordingly, rather than the conventional proprietary editor provided by the manufacturer being only applicable to a specified device, the method allows the user to customize the functions of the input codes of the input device for conforming with various applications via an editor that is configured to support multiple formats defined by different manufacturers of various devices. The profiles are further applied to the various devices via a writer that can appropriately convert the profiles into various formats supported by the devices. It should be noted that the method can be adapted to various input devices that can be the HID-based input devices such as a computer mouse, a keyboard, a joystick, a touch panel or touch pad that can be operated by gestures.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for editing a command set applied to a device, comprising:
   an editor installed in a computer device and used to initiate an editing interface for editing one or more command sets that are correspondingly used to form one or more profiles operated for activating functions of the device, wherein the device includes three or more available memory spaces being provided to store the one or more profiles and being capable of saving other files; and
   a writer used to convert the one or more command sets into the one or more profiles that are in accordance with a format specified to the device, wherein the one or more profiles are available to be written to the device;
   wherein the command set edited in the editor includes a set of scripts of commands and corresponding one or more input codes specified to the device, and the device is capable of storing a plurality of sets of scripts of commands.

2. The system according to claim 1, wherein the input codes are key codes of the device when the device includes one or more keys, touch commands of the device when the device includes a touch panel, or gesture commands of the device when the device is capable of being functioned by gestures.

3. The system according to claim 2, wherein the device is an input device adopting a human-interface-device standard which defines data packets being communicated with a host and supports a series of input codes configured to form the one or more profiles.

4. The system according to claim 3, wherein a switching signal is generated by the host that is connected with the device or by a switching event performed on the device so as to activate one of the profiles stored in the device.

5. The system according to claim 4, wherein the editor uses a storage space of the computer device to store the one or more profiles that are selectively provided to be written to the device based on a memory capacity of the device, and one of the profiles stored in the device can be activated in the device according to the switching signal.

6. The system according to claim 1, wherein the editor runs under an online mode when the device is connected with the computer device via a communication interface, and the one or more profiles stored in the computer device are selectively written to the device by the writer when the one or more command sets has been edited.

7. The system according to claim 1, wherein the editor runs under an offline mode, and the one or more command sets being edited are stored in the computer device; the one or more profiles are selectively written to the device by the writer when the device is connected with the computer device via a communication interface.

8. The system according to claim 1, wherein the editor is configured to support multiple formats defined by manufacturers of various devices, and wherein the one or more command sets edited by the editor are originally stored as a generic format in the computer device and then converted to the one or more profiles in accordance with one of the multiple formats so as to be written to the device that is connected to the computer device.

9. A method for editing a command set applied to a device, comprising:
   initiating an editing interface of an editor installed in a computer device;
   editing one or more command sets that are correspondingly used to form one or more profiles operated for activating functions of the device;
   converting, by a writer, the one or more command sets into the one or more profiles that are in accordance with a format specified to the device; and
   selectively writing the one or more profiles to the device connected with the computer device;
   wherein the command set edited in the editor includes a set of scripts of commands and corresponding one or more input codes specified to the device.

10. The method according to claim 9, wherein the input codes are key codes of the device which includes one or more keys, touch commands of the device which includes a touch panel, or gesture commands of the device which is able to be functioned by gesture.

11. The method according to claim 10, wherein the device is an input device adopting a human-interface-device standard which defines data packets being communicated with a host and supports a series of input codes configured to form the one or more profiles.

12. The method according to claim 11, wherein a switching signal is generated by the host that is connected with the device or by a switching event performed on the device so as to activate one of the profiles stored in the device.

13. The method according to claim 12, wherein the editor uses a storage space of the computer device to store the one or more profiles that are selectively provided to be written to the device based on a memory capacity of the device and one of the profiles stored in the device can be activated in the device according to the switching signal.

14. The method according to claim 13, wherein the device includes three or more available memory spaces being provided to store the one or more profiles and being capable of saving other files.

15. The method according to claim 9, wherein the editor is configured to support multiple formats defined by different manufacturers of various devices, and wherein the one or more command sets edited by the editor are originally stored as a generic format in the computer device and then converted to the one or more profiles in accordance with one of the formats so as to be written to the device that is connected to the computer device.

16. A device, comprising:
   a micro-controller;
   a memory used to store one or more profiles, each of the profiles recording one or more command sets that include a set of scripts of commands and corresponding one or more input codes specified to the device;
   an input interface electrically connected with the micro-controller and being able to initiate an input event configured to activate one of the profiles stored in the device and initiate a command for a host; and
   a communication interface electrically connected with the micro-controller and configured to connect with the host for transmitting the command activated through the input interface via a communication protocol;
   wherein the one or more command sets specified to the device are edited via an editing interface initiated in an editor installed in a computer device, the one or more command sets are correspondingly converted to the one or more profiles in accordance with a format specified to the device, and the one or more profiles are selectively provided to be written to the device and one of the profiles stored in the device can be activated in the device according to a switching signal that is one type of the input event.

17. The device according to claim 16, wherein the input codes are key codes of the device which includes one or more keys, touch commands of the device which includes a touch panel, or gesture commands of the device which is able to be functioned by gesture.

18. The device according to claim 17, wherein the device is an input device adopting a human-interface-device standard which defines data packets being communicated with the host and supports a series of input codes configured to form the one or more profiles.

19. The device according to claim 18, wherein the switching signal is generated by the host that is connected with the device or by a switching event performed on the device so as to activate one of the profiles stored in the device.

20. The device according to claim 19, wherein, when one of the profiles is activated, a prompting message is generated in the host via a protocol under the human-interface-device standard.

21. The device according to claim 16, wherein the device is a computer mouse that includes multiple keys, in which one or more of the keys are used to switch multiple profiles stored in the memory; wherein, when one of the profiles is activated, one corresponding command set is applied to the device.

22. The device according to claim 21, wherein, by actuating one or a combination of keys, the corresponding command set applied to the device is operated to execute functions of an application executed in the host that is connected with the device.

23. The device according to claim 16, wherein the device is able to be functioned by gesture, and a series of gestures performed by a user are recorded as one of the profiles via the editor so as to generate a series of gesture commands corresponding to the command set specified to the device.

24. The device according to claim 23, wherein, by performing the series of gestures specified in the profile applied to the device, the corresponding command set is operated to execute functions of an application executed in the host that is connected with the device.

25. The device according to claim 16, wherein the one or more profiles stored in the memory of the device are readable by the editor and available to be edited by the editor.

26. The device according to claim 25, wherein the device includes three or more available memory spaces being provided to store the one or more profiles and also free to save other files.

* * * * *